(No Model.)
C. H. FISHER.
FENCE MAKING IMPLEMENT.
No. 411,429. Patented Sept. 24, 1889.
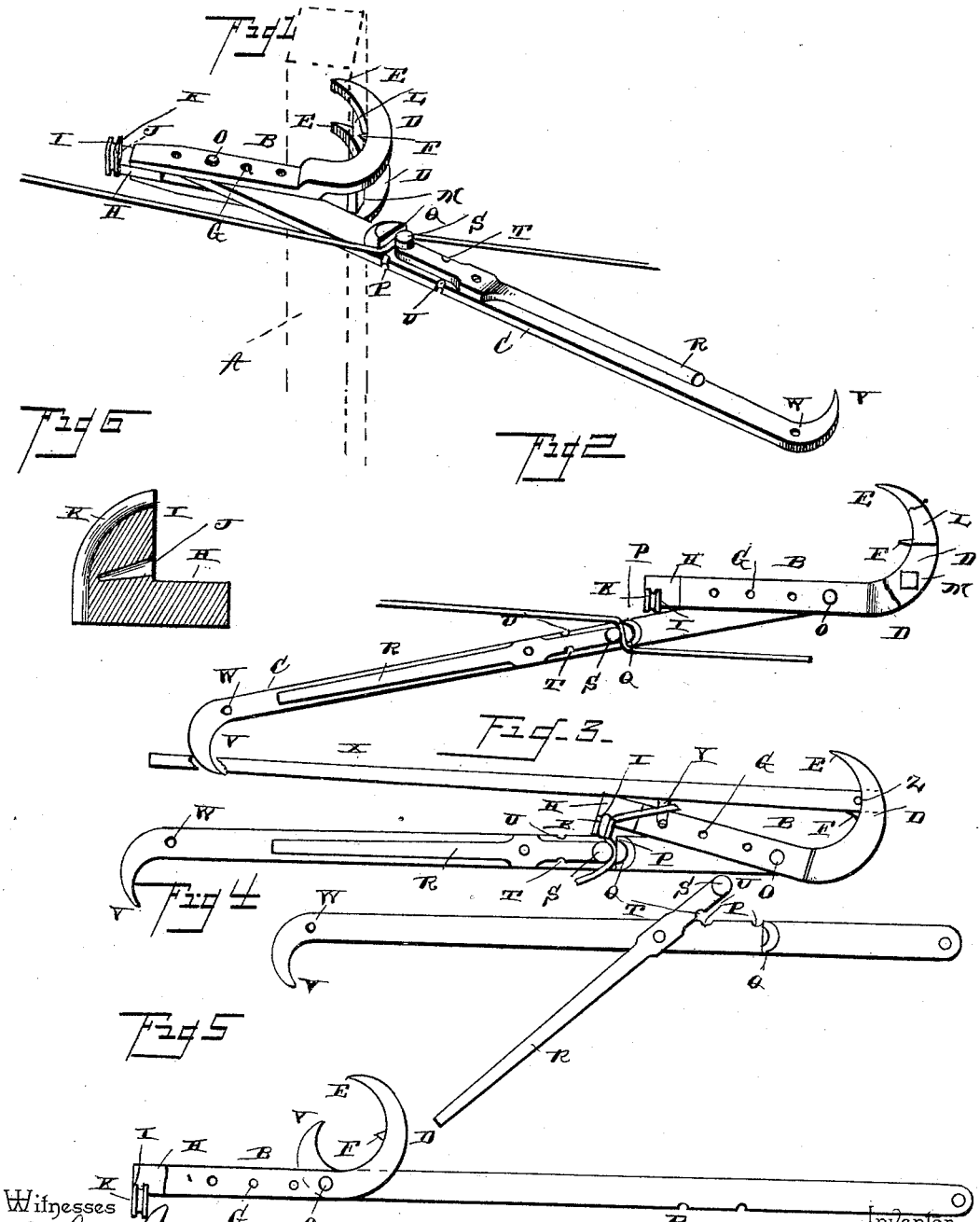

UNITED STATES PATENT OFFICE.

CONRAD H. FISHER, OF WACO, TEXAS.

FENCE-MAKING IMPLEMENT.

SPECIFICATION forming part of Letters Patent No. 411,429, dated September 24, 1889.

Application filed May 21, 1889. Serial No. 311,507. (No model.)

*To all whom it may concern:*

Be it known that I, CONRAD H. FISHER, a citizen of the United States, residing at Waco, in the county of McLennan and State of Texas, have invented a new and useful Fence-Making Implement, of which the following is a specification.

My invention relates to improvements in wire-fence-making implements; and it consists in certain novel features hereinafter described and claimed.

Figure 1 is a perspective view of my improved device, showing the wire stretched. Fig. 2 is a plan view, partly in section, showing the initial position of the device. Fig. 3 is a view showing the device arranged to splice a broken wire. Fig. 4 is a view showing the manner of cutting a wire. Fig. 5 is a view showing the device arranged to extract staples from a post. Fig. 6 is a detail view.

The posts A are set in the ground along the line of the proposed fence, and the wire is secured at one end to the end post, and then carried along the fence past the several posts. When the ends of the wires have been reached, my improved implement is applied to the fence-post, as shown in Fig. 1, and manipulated to stretch the wire.

My improved device consists, essentially, of the body B and the lever C, pivoted thereto.

The body B consists of two similarly-constructed hooks D D, having their ends or points E E adapted to take into the fence-post, and said points are curved in the direction of their lengths and provided in the centers of their concavities with the studs F, which are adapted to take into the post, and thereby secure the body to a post which is too small to be engaged by the ends of the hooks. The hooks are provided along their shanks with the series of openings G, the purpose of which will hereinafter be set forth, and the ends of the shanks are connected by a small plate H, provided at its end with the vertical claw I. The said claw has a recess J in its inner side and a vertical groove K in its outer side. The ends of the hooks are connected by the vertical bars L M, as clearly shown, and the purpose of these bars will hereinafter appear.

The lever C is pivoted at one end between the hooks D by means of a removable pivot bolt or pin O, inserted through one of the openings G and one end of the lever, as shown. The lever is provided in one edge with a notch P, and on its upper side adjacent to said notch it is provided with an offset Q. On the upper side of the lever C, I pivotally mount a supplemental lever R, having a lug S at its end, and the said end moves close to the offset Q. One edge of the supplemental lever is provided with a notch T, which is adapted to coact with a notch U in the edge of the lever C to cut the wire.

The lever C is provided at its free end with an integral hook V, and near the said hook the lever is provided with a perforation W, as shown. When the device is to be used to extract staples, the bolt or pin O is removed from the body and the lever. The lever is then reversed and the pivot-pin is inserted through one of the openings G and the perforation W.

When the device is to be used to splice a broken wire, a lever X is employed, the said lever having a stud or pin Y on one side and provided near one end with the pin Z, as shown. When this lever is used, the end is inserted between the hooks and between the bars L M until the pin Z comes in contact with the edges of the hooks, as clearly shown. Instead of this pin, however, the end of the lever may be provided with a notch adapted to engage one of the bars L M, as will be readily understood.

In practice the body is applied to the post, as shown in Fig. 1, and the lever C is arranged so as to project past the left-hand end of the body. The strand of wire is then placed across the lever and against the offset Q, and the lever R is turned against the wire, so as to clamp it against the said offset. The lever C is then swung toward the right-hand end of the body, thereby stretching the wire, as will be readily understood. The wire is then secured to the post and the operation of stretching the wire performed on another strand. The lever is prevented from being swung too far around, so as to strike against the fence-post, by reason of the bar M, which is arranged in the path of the said lever and at such a point that the motion of the lever will be arrested when the lever has been brought in line with the wire. The play of the lever can be further regulated by inserting the pivot-pin through the proper one of the openings G, and consequently pivoting the lever at that point.

When it is desired to splice a broken wire or to join the ends of two strands, the end of one strand is engaged in the recess J, and the body is then rotated in a horizontal plane, so as to wind the end of the wire around the claw I and in the groove K. The said wire will thus be held against accidental disengagement from the body. The end of the other strand of wire is then clamped between the offset Q and the end of the supplemental lever, as shown in Fig. 3. The lever X is then arranged in position by having its end inserted between the hooks and the bars L M and bringing the lever against the body, so that the stud Y will enter the space between the shanks of the hooks. The said lever will thus be prevented from slipping accidentally from the body and will be held in proper position for operation. The lever X and the lever C are then swung toward each other, so as to bring the ends of the wire together, after which the said ends are twisted upon each other, either by rotating my improved implement or by employing pliers, as will be readily understood.

When it is desired to cut a strand of wire, the wire is passed vertically through the notch U in the lever C, and the supplemental lever is then swung toward the wire and brought forcibly against the same, so as to sever it.

When it is desired to extract staples, the pin O is removed, the lever C is reversed end for end and also inverted, and the hook V is then inserted between the hooks D D, so that the said hook V will project toward the points of the hooks D D. The pivot-pin is then again inserted through the proper opening G and the perforation W, as shown in Fig. 5. The body is then applied to the post and the hook V engaged in the staple, after which the lever is operated so as to withdraw the same, as will be readily understood by reference to Fig. 5.

It will be observed from the foregoing description, taken in connection with the accompanying drawings, that I have provided a very simple and efficient device which will be found exceedingly useful in building wire fences.

By my improved device the wire can be effectually stretched and cut into the desired lengths, and broken wires can be readily spliced. Staples, also, can be easily withdrawn from the post. By providing the points F, I am enabled to apply the device to posts of different sizes, and by providing the series of openings G, I can regulate the sweep of the lever at will. The claw I effectually prevents one end of the wire slipping when the device is used to splice wire, and the other end of the wire is prevented from slipping by bringing it up under the lever and through the notch T before clamping it between the offset Q and the supplemental lever. My device can be manufactured at a trifling cost, and its advantages are thought to be obvious.

Having thus described my invention, what I claim, and desire to secure by Letters Patent, is—

1. The combination of the hooks D D, the bar M between the same, the lever pivoted between the said hooks and limited in its movement by the bar M, and provided on its upper side with the offset Q, and the supplemental lever pivoted on the said lever and adapted to clamp a wire against the offset Q, as set forth.

2. The combination of the hooks D D, the bars L M between the same, the plate H, connecting the ends of the hooks and provided with the claw I, the lever pivoted between the hooks and having the offset Q and carrying a supplemental lever, and a lever having one end adapted to be inserted between the hooks D D, and provided on one edge with a stud Y, as set forth.

3. The combination of the body provided at one end with the claw I, having the recess J and groove K, the lever pivoted to the body and having the offset Q, and the supplemental lever adapted to clamp the wire against the said offset, as set forth.

4. The body consisting of the hooks D D, secured together and having their shanks adapted to lie against one side of the fence-post, and their points adapted to pass around the adjacent side of the post, the said points having the spurs or teeth F at the center of their concavities adapted to take into the body of the post, as set forth.

5. The combination of the body having the claw I, the lever pivoted thereto and having an offset Q, the supplemental lever coacting with said offset, and the lever adapted to engage the body, as and for the purposes set forth.

In testimony that I claim the foregoing as my own I have hereto affixed my signature in presence of two witnesses.

CONRAD H. FISHER.

Witnesses:
T. G. THOMSON,
C. R. BENSON.